April 11, 1939. C. S. BROWN 2,153,657
METHOD OF FORMING CONDUIT OUTLET BOXES
Filed Nov. 7, 1936 3 Sheets-Sheet 1
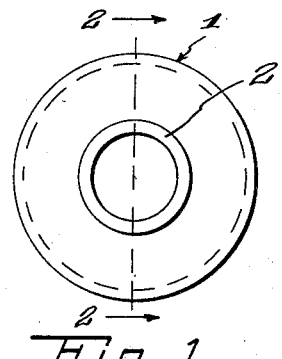
Fig-1-
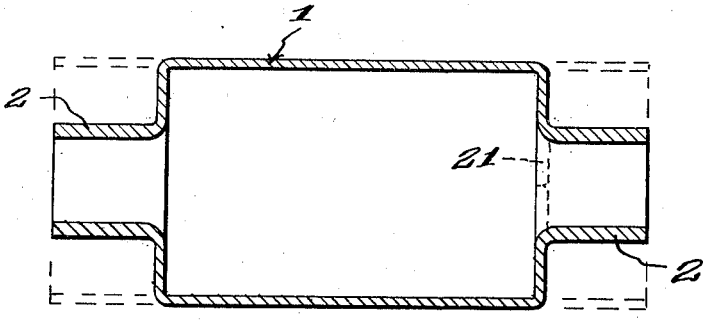
Fig-2-
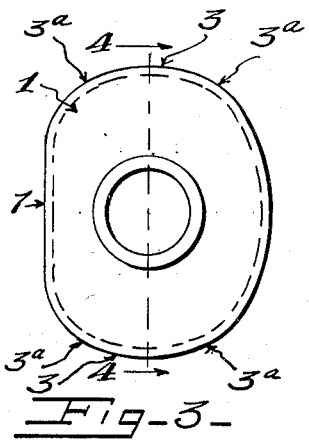
Fig-3-
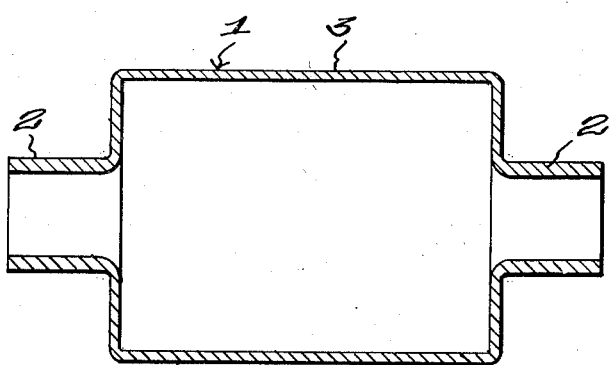
Fig-4-
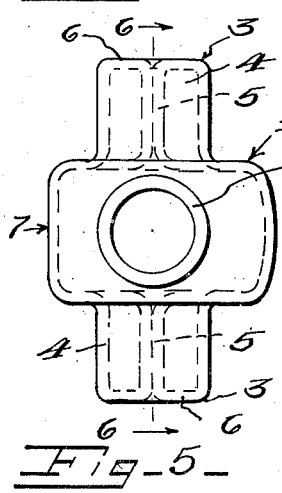
Fig-5-
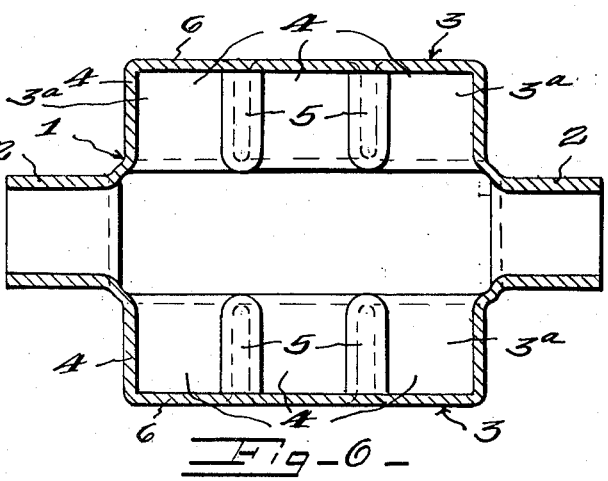
Fig-6-
INVENTOR.
Charles S. Brown
BY Bodell & Thompson
ATTORNEYS.

April 11, 1939.   C. S. BROWN   2,153,657
METHOD OF FORMING CONDUIT OUTLET BOXES
Filed Nov. 7, 1936   3 Sheets-Sheet 2
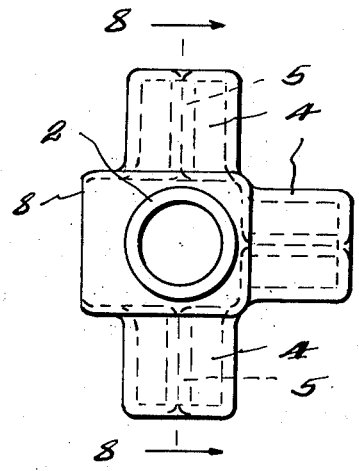
Fig_7_
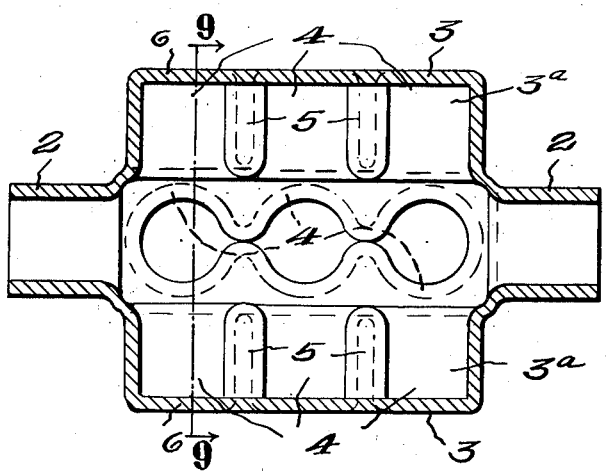
Fig_8_
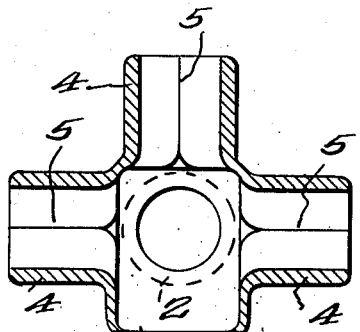
Fig_9_
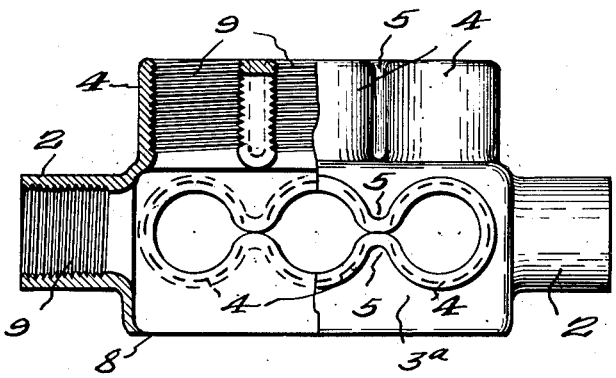
Fig_10_
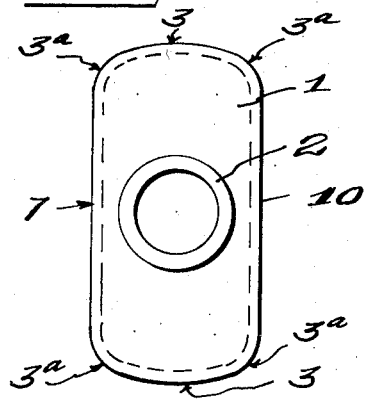
Fig_11_
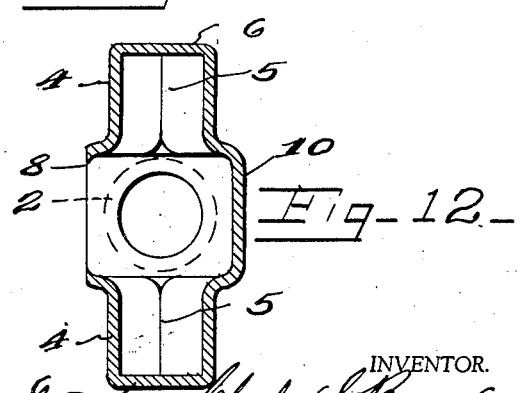
Fig_12_
INVENTOR.
Charles S. Brown
BY Bakewell & Thompson
ATTORNEYS.

April 11, 1939.  C. S. BROWN  2,153,657
METHOD OF FORMING CONDUIT OUTLET BOXES
Filed Nov. 7, 1936  3 Sheets-Sheet 3
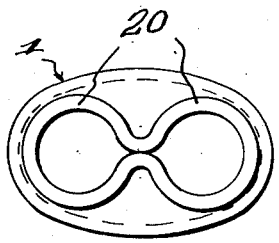
Fig-13-
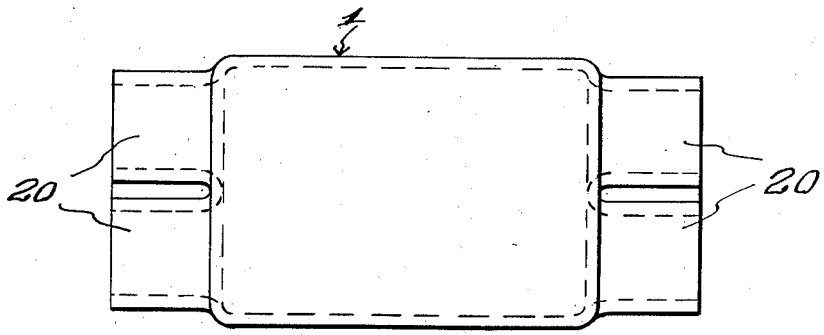
Fig-14-
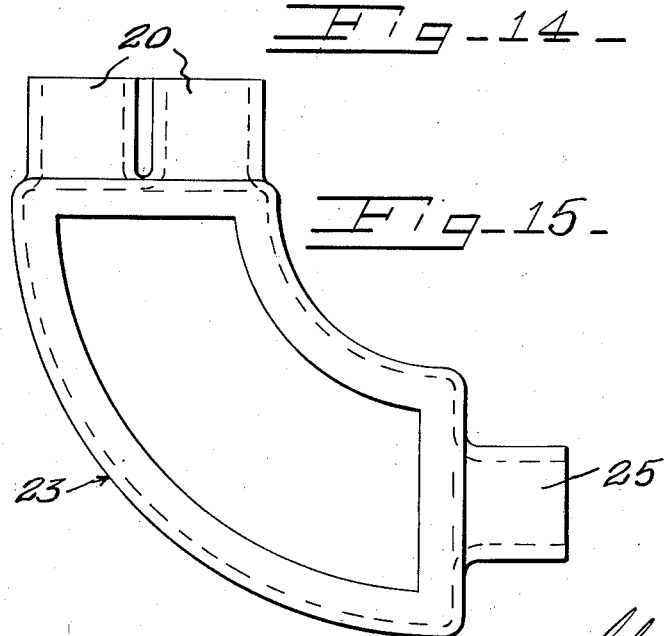
Fig-15-
INVENTOR.
Charles S. Brown
BY Bodell & Thompson
ATTORNEYS.

Patented Apr. 11, 1939

2,153,657

UNITED STATES PATENT OFFICE

2,153,657

METHOD OF FORMING CONDUIT OUTLET BOXES

Charles S. Brown, Syracuse, N. Y.

Application November 7, 1936, Serial No. 109,745

8 Claims. (Cl. 29—155.5)

This invention relates to electrical conduit outlet boxes, and has for its object a conduit outlet box having angularly related conduit-receiving nipples formed integrally with the body of the box, the box and integral nipples formed from a tubular blank by deforming the circumferential wall of the blank to provide one or more nipples arranged with their axes at an angle to the longitudinal axis of the blank. It further has for its object the method of forming conduit outlet boxes having conduit-receiving nipples integral therewith on one or more of its sides, or a conduit outlet box which can be formed up from tubular stock.

The invention consists in the conduit outlet box and in the method hereinafter set forth and claimed.

In describing this invention, reference is had to the accompanying drawings in which like characters designate corresponding parts in all the views.

Figures 1 and 2 are respectively an end elevation and a longitudinal sectional view of a tubular blank, after both ends have been contracted or reduced in diameter to close the ends of the tubular blank and provide conduit-receiving nipples at the ends, Figure 2 being taken on line 2—2, Figure 1.

Figure 3 is an end elevation of the blank after the blank has been flattened into a figure in cross section having a minor and major diameter or what for convenience might be called an elliptical form.

Figure 4 is a longitudinal vertical sectional view taken on line 4—4, Figure 3.

Figure 5 is an end elevation after the lateral nipple forming operation.

Figure 6 is a sectional view taken on line 6—6, Figure 5.

Figure 7 is an end elevation, after the top of the blank (Figure 5) has been cut off and the bottom formed with conduit-receiving nipples.

Figure 8 is a sectional view taken on line 8—8, Figure 7.

Figure 9 is a sectional view taken on line 9—9, Figure 8.

Figure 10 is an elevation, partly in section, of the finished box.

Figure 11 is a view similar to Figure 3 showing the blank when the lateral sides and not the bottom of the box are provided with nipples.

Figure 12 is a sectional view similar to Figure 9 of the finished box formed from the blank shown in Figure 11.

Figures 13 and 14 are an end elevation and a plan view, respectively, of the tubular blank, after being formed with a plurality of nipples on the ends thereof.

Figure 15 is a plan view of an angular or elbow box shown, as provided with a plurality of nipples on one end and with but one nipple on the other end.

The method consists in taking a tubular sheet metal blank of a given diameter, reducing or contracting the end portions thereof into less diameter, and providing cylindrical conduit-receiving nipples at one or both ends of the tubular blank, flattening the body of the blank between the nipples into a form having a major and minor diameter or into what for convenience might be called an elliptical formation, then by forming operations providing one or both of the end portions of the elliptical formation with one or more conduit-receiving nipples by contracting the opposite curved walls of the end portions of the elliptical formation inwardly at spaced apart points along lines parallel to the major axis of the elliptical formation or at an angle to the axis of the tubular blank, and holding the portions between said spaced apart lines from contracting, until the contracted portions touch each other, thereby providing a cylindrical opening, or openings, and then removing a portion of the wall of the body to provide a cover receiving opening, leaving the end portions of the elliptical formation with the nipples on opposite sides of the opening. The outer end walls of these openings are then removed. The bottom of the box, that is, the wall opposite the cover opening may then be deformed to provide one or more additional nipples. The nipples receive conduits and may be threaded to receive the threaded ends of the conduits. The tubular blank may be formed from a flat stock into tubular form, but the subject matter of this invention starts with a stock tubular blank, regardless of how it is formed.

I designates the body of the tubular blank, and 2 the end portions or nipples, after being reduced in diameter to provide nipples. The end portions 2 are reduced by any suitable contracting or forming operation. In Figure 3, the blank I is shown as flattened to have a major diameter and a minor diameter. In Figure 3, one side is shown as flat, and the opposite side as retaining its curvature. The flattening operations cause the curved side portions 3 of the tubular body I to elongate or bulge outwardly. The opposing curved lateral sides 3ª of the body at the ends of the major diameter are then, by forming operations, provided with one or more laterally extending nipples 4 (Figure 6). These nipples 4 are provided by contracting, drawing or pressing inwardly portions 5 at spaced apart points of the bulging sides 3ª along lines parallel to the major axis of the elliptical formation or at an angle to the axis of the blank, and holding, as by a hydraulic fluid, the portions between said lines from contracting, thus forming the end portions 3 of the walls of the elliptical formation into one or more cylindrical nipples, a half of each nipple being provided on each of said walls 3ª. The closed ends 6 (Figure 6) of the nipples are cut off, and also the flattened side 7 of the blank is cut off to provide a cover receiving opening 8 through which the interior of the box is accessible. This opening may be provided with a suitable cover or may be closed by a fixture of any well known construction.

If the box is to be provided with laterally extending nipples only on one or both lateral sides, the walls of the tubular body opposite the opening may also be flattened at 10, as shown in Figures 11 and 12, during the flattening operation, but if the bottom wall opposite the opening 8 is also to be provided with one or more conduit-receiving nipples, it is left rounding, as in Figure 3, and is formed with nipples in a manner similar to that described in connection with the nipples 4 (Figure 6) after the wall 7 has been removed to form the cover opening 8 or the nipple or nipples on the bottom may be provided by any other deforming operation, as by a drawing operation.

The box thus formed needs no machining other than threading the nipples, as at 9, to receive threaded conduits. The nipples may be left unthreaded, if conduits are to be used, which are held in the nipples by a drive fit or by distorting or indenting the nipple into a conduit.

The ends of the nipples including a small annular portion of the side walls may be cut off or circular holes cut in the ends of the nipples.

In some instances, it may be desired to have the box formed with more than one nipple at one or both ends or to have the box closed at one end. In Figure 13, a box is shown in which both opposite ends are provided with a plurality of nipples 20 corresponding to the nipples 2 (Figure 6). In forming the box with a plurality of nipples at either end, a tubular blank of the proper length is taken and deformed into a figure in cross-section having a major and minor diameter and for convenience called elliptical form, and then the end portions are deformed to provide the nipples 20, in a manner similar to that in which the laterally extending nipples 4 are formed, by compressing the end portions of the tubular blank, after it has been formed into elliptical form along parallel lines, spaced apart from each other and extending in a direction lengthwise of the axis of the tubular blank, until opposing walls of the end portion touch each other forming the nipple. Also one or both ends of the box may be entirely closed or unprovided with nipples, if desired, and this is done by taking the tubular blank, as shown in Figure 2, and reducing the end portion thereof, and instead of forming the nipple 2, contracting the end portion of the blank which would otherwise form the nipple 2 into position to entirely close the end of the box, as shown by the broken lines at 21 (Figure 2).

In Figure 15 is shown an angular or elbow box 23 formed from a tubular blank bent in an easy curve into elbow formation and with a pair of nipples 20 formed, as shown in Figure 13, at one end with a single nipple 25 similar to the nipple 2 (Figure 4) at the other end.

An outlet box constructed, as described, is especially economical in manufacture in that it can be made up from tubular stock. Obviously, any number of nipples may be provided on one blank or a plurality of sides of the body of a box, by using suitable length of tubing blank, and if any of the nipples are not to be used, they may be closed by suitable plugs.

As this outlet box can be made by being stamped out of sheet metal tubular blanks, the cost of production is much less than casting and the sheet metal article will stand much rougher handling and is not liable to fracture under rough handling. With the proper tools and equipment, a great saving in time and cost is effected. The material is preferably steel or an alloy of steel containing copper, the metal making the steel more ductile and resistant to corrosion, rusting, etc.

What I claim is:—

1. The method of forming a conduit outlet box consisting in taking a tubular sheet metal blank, reducing one end thereof into tubular form of less diameter than the blank, forming a conduit-receiving nipple, flattening the tubular body into a general elliptical form, and cutting an opening in one of the long sides of the elliptical formation to provide a cover opening through which the interior of the box is accessible, forming one end of the elliptical formation with one or more tubular conduit-receiving nipples by contracting the opposite sides of that portion, with respect to the major diameter of the elliptical formation toward each other along spaced apart lines extending in a direction parallel to the major diameter to form one or more cylindrical nipples and cutting off the walls at the outer ends of said last named nipples.

2. The method of forming conduit outlet boxes consisting in taking a tubular sheet metal blank, reducing one end thereof into tubular form of less diameter than the blank to form a conduit-receiving nipple, flattening the tubular body into a general elliptical form, cutting an opening in one of the long sides of the elliptical formation extending transversely of the major diameter of the elliptical formation, leaving end portions, with respect to the major diameter of the elliptical formation, on opposite lateral sides of the opening and forming from one of said end portions one or more conduit-receiving nipples by forming portions of said end portions into tubular formation extending laterally relative to the axis of the tubular blank and in a direction parallel to said major axis and by cutting off the ends of said tubular formation of said end portion.

3. The method of forming conduit outlet boxes consisting in taking a tubular sheet metal blank, reducing one end thereof into tubular form of less diameter than the blank to form a conduit-receiving nipple, flattening the tubular body into a generally elliptical form and cutting an opening in one of the long sides of the elliptical formation extending transversely of the major diameter of the elliptical formation and lengthwise of the axis of the blank, compressing end portions, with respect to the major diameter of the elliptical formation, on opposite lateral sides of the opening inwardly toward the major diameter of the elliptical formation, opposite elliptical side walls of said end portions along spaced apart lines extending in a direction parallel to the major diameter while preventing compressing inwardly of the portions between said spaced apart lines, and cutting off the ends of the tubular portions left between the spaced apart lines.

4. The method of forming conduit outlet boxes consisting in taking a tubular sheet metal blank, reducing one end thereof into tubular form of less diameter than the blank to form a conduit-receiving nipple, flattening the tubular form of the body into a generally elliptical form and cutting a cover opening in one of the long sides of the elliptical formation extending transversely of the major diameter of the elliptical formation and lengthwise of the axis of the tubular blank, leaving end portions, with respect to the major diameter of the elliptical formation, on opposite lateral sides of the opening, forming from one of said end portions a conduit-receiving nipple by forming portions of said end portion into tubular form, by compressing inwardly opposite curved side walls of said end portion along spaced apart lines while preventing compressing inwardly of the portions between said spaced apart lines extending in a direction parallel to the major diameter, cutting off the circular ends of the tubular portions left between the spaced apart lines, and similarly forming a nipple on the side of the body opposite said cover opening.

5. The method of forming a conduit outlet box consisting in taking a sheet metal tubular blank, reducing the end portions thereof into less diameter than the blank to form end walls on the body of the blank, cutting an opening in one side of the body and extending lengthwise of the axis of the blank to provide a cover opening through which the interior of the box is accessible, and forming the body into matched pairs of semi-cylindrical portions extending transversely of the axis of the body, and cutting off the outer ends of the semi-cylindrical portions to provide a nipple extending laterally relatively to the axis of the tubular blank.

6. The method of forming a conduit outlet box consisting in taking a sheet metal tubular blank, reducing the end portions thereof into less diameter than the blank to form end walls on the body of the blank, cutting an opening in one side of the body and extending lengthwise of the axis of the blank to provide a cover opening through which the interior of the box is accessible, and forming the body into matched pairs of semi-cylindrical portions extending transversely of the axis of the body, and cutting off the outer ends of the semi-cylindrical portions to provide a nipple extending laterally relatively to the axis of the tubular blank, by compressing toward each other along spaced apart lines opposite curved peripheral walls of the body, until said opposite portions engage each other along said lines, and holding the portions between said lines in spaced relation.

7. The method of forming conduit outlet boxes including taking a tubular sheet metal blank, flattening the tubular body into more or less elliptical form, forming one end of the elliptical formation, with respect to the major diameter of the elliptical formation, with a tubular conduit-receiving nipple by contracting opposite sides of one of said end portions of the elliptical formation toward each other along spaced apart lines extending in a direction parallel to the major diameter to form a cylindrical opening, cutting off the walls at the ends of said opening either before or after said nipple forming operation, deforming the end portion of the tubular blank to close one end hereof.

8. The method of forming a conduit outlet box consisting in taking a tubular blank, reducing one end thereof into tubular form of less diameter than the body of the blank, and thereby forming a cylindrical conduit-receiving nipple coaxial with the axis of the blank, flattening the tubular body into a general elliptical form with the ends of the elliptical formation with respect to the major diameter of said formation extending on opposite sides of the axial line of the nipple and with the minor diameter of the elliptical formation greater than the diameter of the cylindrical nipple, and cutting an opening of approximately the same width as the diameter of the cylindrical nipple with the opening extending lengthwise of the axis of the body.

CHARLES S. BROWN.